United States Patent
Mandon et al.

(10) Patent No.: US 9,635,931 B2
(45) Date of Patent: May 2, 2017

(54) TABLE WITH ELECTRICAL PORTS

(71) Applicant: Apple Inc., Cupertino, CA (US)

(72) Inventors: Kully Mandon, San Francisco, CA (US); Christopher M. Green, Woodside, CA (US); Jonathan P. Siegel, San Francisco, CA (US); Edwin Wood, San Francisco, CA (US); Andrew Murphy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/274,418

(22) Filed: May 9, 2014

(65) Prior Publication Data

US 2015/0320203 A1    Nov. 12, 2015

(51) Int. Cl.
   *A47B 37/00*   (2006.01)
   *A47B 21/06*   (2006.01)
   *A47B 21/00*   (2006.01)

(52) U.S. Cl.
   CPC .............. *A47B 21/06* (2013.01); *A47B 21/00* (2013.01); *A47B 2021/066* (2013.01); *A47B 2021/068* (2013.01)

(58) Field of Classification Search
   CPC ...... A47B 2037/005; A47B 2200/0013; A47B 2200/008; A47B 2200/0081; A47B 2200/0082; A47B 2021/066; A47B 2021/068; A47B 21/00; A47B 21/06; H01R 35/04
   USPC .......... 108/50.02; 312/223.3, 223.6; 439/131
   See application file for complete search history.

(56) References Cited

U.S. PATENT DOCUMENTS

| 4,511,198 A | 4/1985 | Mitchell et al. |
| 4,747,788 A | 5/1988 | Byrne |
| 4,984,982 A * | 1/1991 | Brownlie ............. G02B 6/4451 174/490 |
| 5,033,804 A * | 7/1991 | Faris ..................... A47B 21/00 312/223.3 |

(Continued)

FOREIGN PATENT DOCUMENTS

| CN | 202276987 | 6/2012 |
| GB | 2463695 | 3/2010 |

OTHER PUBLICATIONS

"HPX-1600: 16 Module Retractable Connection Ports", accessed at http://web.archive.org/web/20090905144235/http://www.amx.com/products/HPX-1600.asp, archived on Sep. 5, 2009, 2 pages.

(Continued)

*Primary Examiner* — Hanh V Tran
(74) *Attorney, Agent, or Firm* — Sterne, Kessler, Goldstein & Fox P.L.L.C.

(57) ABSTRACT

A table having electrical ports for supplying power or data. The table may include one or more port housings having one or more electrical ports disposed on a surface of the port housing. The port housing may be configured to rotate between a first position and a second position. In the first position, the one or more electrical ports may be concealed beneath the top surface of the table. In the second position, the one or more electrical port may be deployed above the top surface table. The table may include a motor coupled to an assembly for rotating the one or more port housings between the first position and the second position.

36 Claims, 20 Drawing Sheets

(56) References Cited

U.S. PATENT DOCUMENTS

| | | | | |
|---|---|---|---|---|
| 5,231,562 A * | 7/1993 | Pierce | A47B 21/06 108/50.02 |
| 5,575,668 A * | 11/1996 | Timmerman | A47B 21/06 174/482 |
| 5,709,156 A * | 1/1998 | Gevaert | A47B 21/06 108/26 |
| 6,352,037 B1 * | 3/2002 | Doyle | A47B 9/00 108/147 |
| 6,443,543 B1 * | 9/2002 | Chiang | A47B 21/00 180/65.1 |
| 6,588,346 B1 * | 7/2003 | Bockheim | A47B 17/065 108/50.02 |
| 6,796,247 B1 * | 9/2004 | Iglseder | G06K 7/10336 108/50.01 |
| 7,439,694 B2 * | 10/2008 | Atlas | A47B 9/04 108/146 |
| 7,578,243 B2 * | 8/2009 | Gevaert | A47B 21/0073 108/25 |
| 7,626,120 B1 | 12/2009 | Golden et al. | |
| 7,665,709 B2 * | 2/2010 | Cvek | A47B 21/007 108/25 |
| 7,757,612 B2 * | 7/2010 | Korber | A47B 21/00 108/25 |
| 7,784,412 B2 * | 8/2010 | Korber | A47B 21/0073 108/25 |
| 7,966,951 B1 * | 6/2011 | Black | H02G 3/128 108/50.01 |
| 8,316,777 B1 * | 11/2012 | Rosing | A47B 23/046 108/49 |
| 8,925,469 B2 * | 1/2015 | Bennie | A47B 21/06 108/50.02 |
| 8,939,296 B2 * | 1/2015 | Weyler | A47B 46/00 108/50.02 |
| 8,943,978 B2 * | 2/2015 | Soper | A47B 21/06 108/50.02 |
| 2003/0070592 A1 * | 4/2003 | Grasse | A47B 21/06 108/50.02 |
| 2004/0147147 A1 * | 7/2004 | Griepentrog | H01R 13/447 439/131 |
| 2005/0217540 A1 * | 10/2005 | Novak | A47B 83/001 108/50.01 |
| 2005/0268823 A1 * | 12/2005 | Bakker | A47B 21/06 108/50.02 |
| 2006/0042520 A1 * | 3/2006 | Stevens | A47B 1/08 108/50.02 |
| 2007/0022918 A1 * | 2/2007 | Sweet | A47B 21/06 108/50.02 |
| 2008/0121147 A1 * | 5/2008 | Cooke | A47B 21/06 108/50.02 |
| 2008/0231154 A1 * | 9/2008 | Rudduck | E05B 17/0037 312/333 |
| 2008/0295743 A1 * | 12/2008 | Beam | A47B 21/00 108/50.02 |
| 2009/0029576 A1 * | 1/2009 | Shunjie | H01R 13/44 439/131 |
| 2009/0165679 A1 * | 7/2009 | Bakker | A47B 21/06 108/50.02 |
| 2009/0165680 A1 * | 7/2009 | Bakker | A47B 21/06 108/50.02 |
| 2009/0266274 A1 * | 10/2009 | Berlin | A47B 23/046 108/6 |
| 2010/0041258 A1 | 2/2010 | Shunjie | |
| 2010/0178797 A1 * | 7/2010 | Byrne | H05K 5/03 439/540.1 |
| 2011/0297052 A1 * | 12/2011 | Martin | A47B 13/003 108/27 |
| 2013/0081559 A1 * | 4/2013 | Roh | A47B 97/00 108/50.02 |

OTHER PUBLICATIONS

"Network/Lan/RJ45 Conference Table Power Outlet", accessed at http://chinajunnan.en.alibaba.com/product/718911759-215264759/Network_Lan_RJ45_Conference_Table_Power_6Outlet.html, accessed Mar. 22, 2015, 6 pages.

"Retractable Power Post Pole", acccesed at https://web.archive.org/web/20081208135859/http://www.edsuk.com/item.php?id=241, archived on Dec. 8, 2008, 2 pages.

Notification of Transmittal of the International Search Report and the Written Opinion of the International Searching Authority, or the Declaration, directed to International Appl. No. PCT/US2015/029420 mailed Oct. 22, 2015, 15 pages.

* cited by examiner

TABLE WITH ELECTRICAL PORTS

FIELD

The described embodiments relate generally to tables with ports for supplying power and/or data to electronic devices. More particularly, the embodiments relate to tables with ports for supplying power and/or data that can be concealed when not in use.

BACKGROUND

A retailer or other person may desire to provide a table having a power and/or data supply to provide power and/or data to electronic devices. In some cases, the retailer may desire the power and/or data ports hidden from view while not in use.

SUMMARY

A retailer or other user may have various locations within a store or other location for using, displaying, testing, and/or providing technical assistance for electronic devices. The retailer may wish to provide tables at these locations to provide a convenient place for people (e.g., customers, salespeople, and technical support personnel) to use the electronic devices. Users in some cases may need power and/or data ports for facilitating operation, testing, and/or technical assistance of the electronic devices. In other cases, power and data ports may not be needed.

In some embodiments of the present invention, a table is provided with power and/or data ports conveniently located at a top surface of the table. When not needed, the table top surface remains as a flat expanse uninterrupted by power and/or data ports, to maximize working surface, where the power and/or data ports are hidden from view. When needed, the power and/or data ports may be made to rise from the table top surface to become accessible to a user.

To accomplish this, the retailer may use a table or elements thereof according to embodiments described herein.

In some embodiments, a table includes a table top surface defining at least one aperture therethrough with a port housing disposed in the aperture and rotatable between a first position and a second position. The port housing may include a top surface and a functional surface coupled to the top surface where at least one port is coupled to the functional surface for supplying power or data. The port housing top surface may be flush with the table top surface and immediately adjacent to the table top surface in the first position.

In some embodiments, a table includes a table top surface and a port housing rotatable between a first position and a second position. The port housing may include a top surface, a functional surface coupled to the top surface, a cavity defined by a cavity wall, and least one port coupled to the functional surface for supplying power or data. The table may also include a linkage coupled to the cavity wall, a motor and a gear box coupled to the linkage via a drive shaft, where the motor, the gear box, the drive shaft, and the linkage are configured to rotate the port housing between the first and second positions.

In some embodiments, a table includes a port housing configured to be rotated between a first position and a second position. The port housing may include a top surface, a functional surface coupled to the top surface, and at least one port coupled to the functional surface for supplying power or data. The table may also include a motor configured to rotate the port housing between the first position and the second position, a sensor coupled to the table and in communication with a controller. The controller may be configured to detect a first signal and a second signal from the sensor, rotate the port housing from the first position to the second position in response to detecting the first signal, and rotate the port housing from the second position to the first position in response to detecting the second signal.

In some embodiments, a method for reversibly deploying electrical ports on a table includes receiving a first signal from a sensor, rotating a port housing from a first position to a second position relative to a top surface of the table in response to receiving the first signal, receiving a second signal from the sensor; and rotating the port housing from the second position to the first position in response to receiving the second signal. A top surface of the port housing may be flush with the table top surface in the first position, and the port housing top surface may be oriented at an oblique angle to the table top surface and at least one electrical port of the port housing may be deployed above the table top surface in the second position

BRIEF DESCRIPTION OF THE DRAWINGS

The disclosure will be readily understood by the following detailed description in conjunction with the accompanying drawings, where like reference numerals designate like structural elements, and in which.

DETAILED DESCRIPTION

Figure 1:
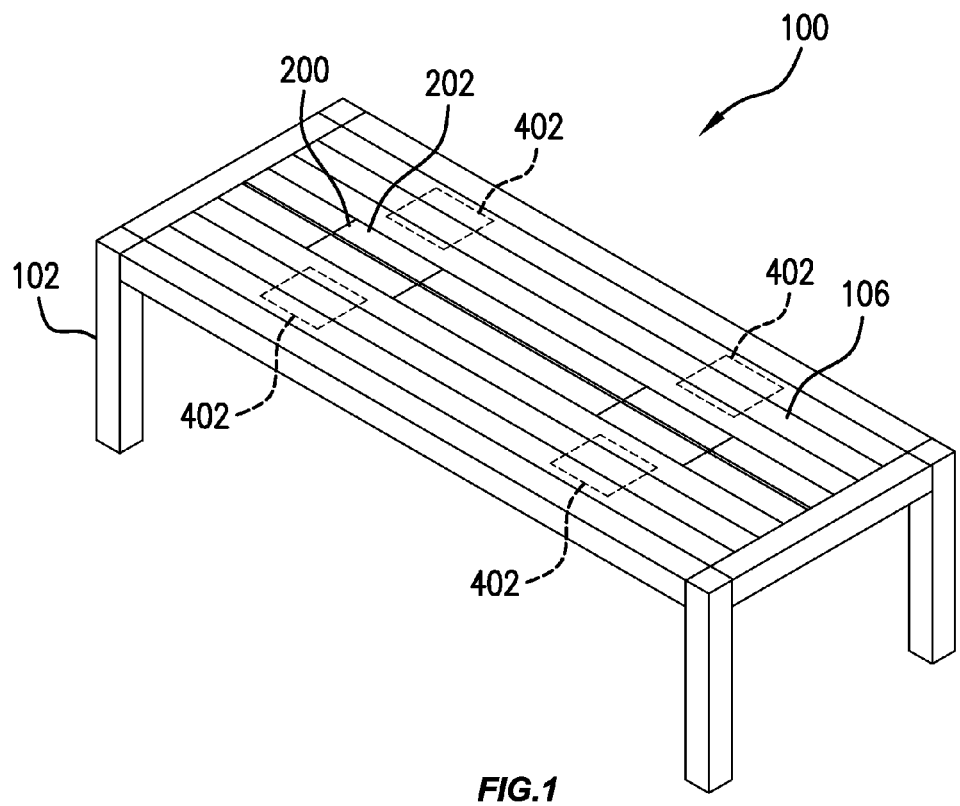
FIG. 1 shows a perspective view of a table according to an embodiment.

Reference will now be made in detail to representative embodiments illustrated in the accompanying drawings, in which like reference numerals are used to indicate identical or functionally similar elements. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A retailer or other user may have various locations within a store or other location for using, displaying, testing, and/or providing technical assistance related to electronic devices. The retailer may wish to provide a table at one or more of these locations to the provide salespeople, customers, and technical support personnel with a convenient place for working with the electronic devices. Moreover, the retailer may wish to provide power and/or data ports on the table surface for conveniently facilitating testing and technical assistance, but may not want these power and/or data ports to interfere with the table's work surface when not needed.

To keep the power and/or data ports on a table surface accessible when needed, but stowed and hidden from view when not needed, the power and/or data ports may be concealed under the table's surface in a first position and accessible above the table's surface in a second position. The retailer may further desire that the power and/or data ports be concealed in an inconspicuous manner that does not interfere with the table's work surface. To accomplish this, the retailer may use a table as described herein, where the power and/or data ports are incorporated into a port housing that rotates up from the table surface to reveal the ports, and rotates down under the table surface to stow the ports and provide a flat working surface. Although this document describes its table in terms of a retailer facilitating use, display, testing, or technical assistance related to electronic devices, the table can be used in any situation where power and/or data is to be provided through ports incorporated in a surface such as, for example, a desk, a floor, a wall, a temporary workstation, or mobile kiosk for electronic devices.

A retailer that provides locations for testing and/or technical assistance may further desire that the power and/or data ports automatically move from a concealed position to an accessible position. The automatic movement between the concealed position and the accessible position may be initiated using one or more sensors coupled to a motor. When a specific signal (e.g., hand motion signal, proximity signal, RFID (radio-frequency identification) signal, fingerprint match signal, and/or weight threshold signal, etc.) is detected by the sensor, the motor may move the power and/or data ports between the concealed position and the accessible position. Such signals may be transmitted over a wired network (e.g., as direct electrical signals) and/or a wireless network (e.g., as radio signals).

These and other embodiments are discussed below with reference to FIGS. 1-30. However, those skilled in the art will readily appreciate that the detailed description given herein with respect to these figures is for explanatory purposes only and should not be construed as limiting.

Embodiments of the present invention include a table 100 for facilitating operation of electronic devices. Table 100 may have one or more port housings 200, each having one or more electrical ports 206. As used herein, "electrical ports" encompasses both data ports and power ports. As shown in FIGS. 1-9, table 100 may include legs 102 and a table top 104 having a table top surface 106 and a bottom surface 107. In some embodiments, table top 104 may include a cavity 105 defined by bottom surface 107. In some embodiments, cavity 105 is defined by bottom surface 107 and a bottom panel 109. Table 100 may have one or more cross-supports 110 (see FIG. 4) supporting table top 104 and providing structural rigidity to table top 104. Table top surface 106 may also define one or more apertures 112 therethrough, each for receiving a port housing 200. Port housings 200 may be configured to rotate between a first position relative to table top surface 106 where electrical ports 206 are concealed within table 100 (see FIG. 1) and a second position relative to table top surface 106 where electrical ports 206 are accessible above table top surface 106 (see FIG. 2).

Figure 2:
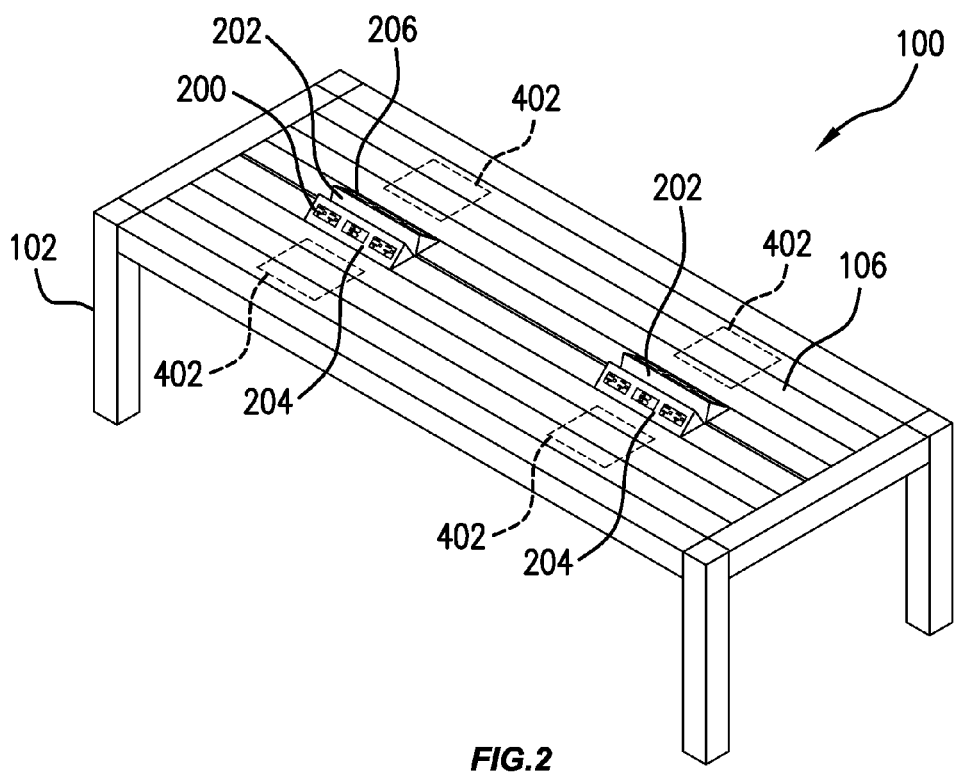
FIG. 2 shows a perspective view of a table according to an embodiment.
Figure 3:
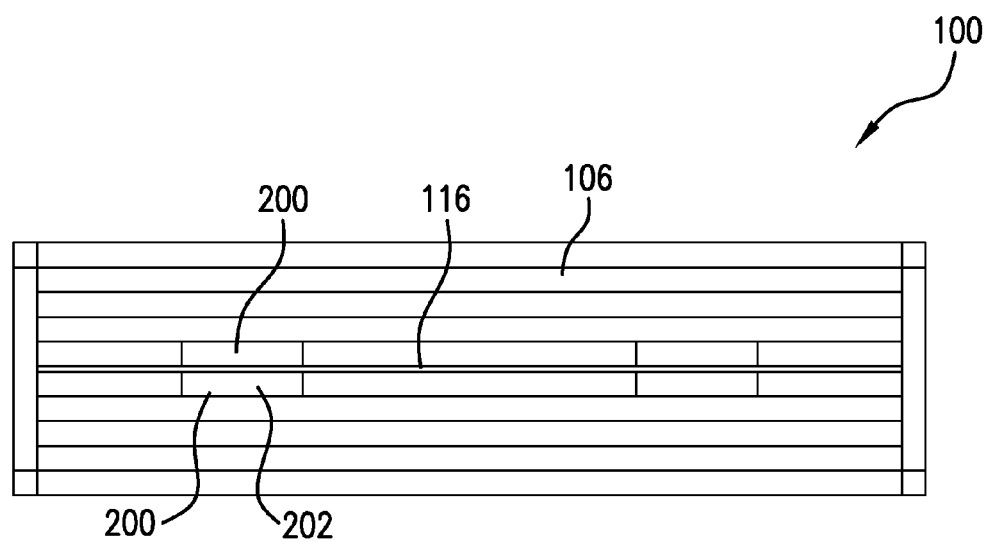
FIG. 3 shows an aerial view of a table according to an embodiment.

As shown in FIGS. 1 and 2, port housing 200 includes a top surface 202 and a functional surface 204. Electrical ports 206 may be disposed on the functional surface 204. In the first position, shown in FIGS. 1, 6, and 7, top surface 202 of port housing 200 is flush with table top surface 106. To avoid visual or physical interruption in table top surface 106, in some embodiments table 100 (including port housing 200) does not include a bezel or any additional structure around the edges of port housing 200 (i.e., top surface 202 is immediately adjacent to and aligned with table top surface 106). In other words, port housing top surface 202 is immediately adjacent to table top surface 106 in the first position.

Some conventional tables may include bezels, sheaths, escutcheons, or other edge features around apertures or operative parts stowed within or extending from the table surface. These edge features may interrupt the table top surface both physically and visually, interfering with the free use and visual effect of an otherwise uninterrupted work surface. For example, even the small lip of an escutcheon, bezel, or sheath extending above the table top surface can catch on papers, devices, or other objects being used on the work surface, thus interfering with its free use.

In embodiments of the present invention, the lack of such edge features surrounding port housing 200 provides a physically and visually uninterrupted table top surface free from clutter when port housing 200 is in the first, stowed position. In such embodiments, electrical ports 206 can be inconspicuously concealed within table 100 and the entire table top surface 106 can be freely utilized when port housings 200 are in the first position.

Figure 6:
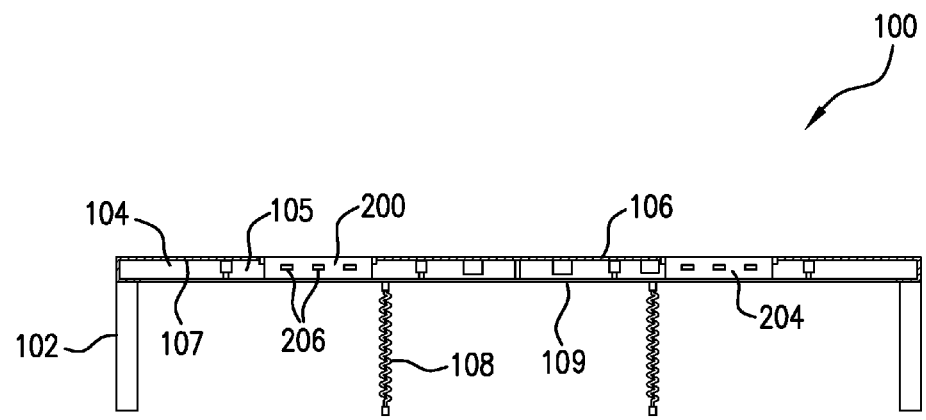
FIG. 6 shows a cross-sectional view of a table according to an embodiment.
Figure 7:
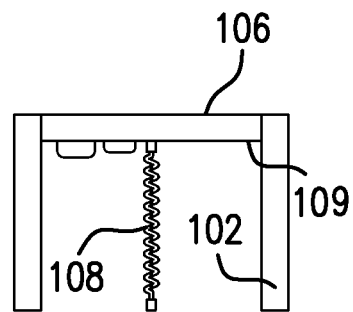
FIG. 7 shows a side view of a table according to an embodiment.

FIGS. 6 and 7 show side views of an embodiment where top surface 202 is flush with table top surface 106 in the first position, FIG. 6 being a cross-sectional view showing port housings 200 stowed within table top 104. As used herein, "flush" refers to top surface 202 of port housing 200 and table top surface 106 sharing the same geometric plane, at least at their edges. In some embodiments, the flush surfaces may be flush within a deviation of +/−1/16 of an inch, which is generally imperceptible to a casual observer and will not interfere with use of top surface 202 and table top surface 106 together as a smooth, uninterrupted work surface. It can be seen that no portion of port housing 200 extends above table top surface 106. Additionally, as shown in FIGS. 6 and 7, table top 106 may have a completely flat profile when port housings 200 are stowed in the first position. This allows the entire table top surface 106, including top surfaces 202 of port housings 200, to be utilized without interference from irregular surface features. Further, apertures 112 may have a shape (e.g., rectangular) to accommodate a portion of port housing 200 having a corresponding shape. To effect the physically and visually uninterrupted table top surface, port housing 200 may closely fit within aperture 112. For example, in the first, stowed, position, top surface 202 of port housing 200 may be spaced apart from table top surface 106 by 1/8 of an inch or less (e.g., 1/16 of an inch).

In the second position, shown in FIG. 2, top surface 202 and functional surface 204 each extend at least partially above and are oriented at a non-zero angle relative to table top surface 106. In the second position, a user may plug power and/or data plugs into electrical ports 206. Electrical ports 206 may include any suitable power or data outlet such as, for example, A/C or D/C power, Universal Serial Bus (USB), micro-USB, mini-USB, Advanced Technology Attachment (ATA) (e.g., Parallel ATA, Serial ATA), Ethernet (e.g., Cat 5), or any other standard or proprietary connection format.

In the second position, top surface 202 and functional surface 204 may be oriented at any non-zero angle relative to table top surface 106. For example, top surface 202 and/or functional surface 204 may be oriented at an angle, such as, but not limited to 30°, 45°, 60°, or 90° relative to table top surface 106. In some embodiments, top surface 202 and functional surface 204 may be oriented at the same angle relative to table top surface 106. In some embodiments, top surface 202 and functional surface 204 may be oriented at different angles relative to table top surface 106. In some embodiments, top surface 202 and functional surface 204 may be fixed relative to each other at a nonzero angle; in some embodiments less than 90 degrees.

Figure 5:
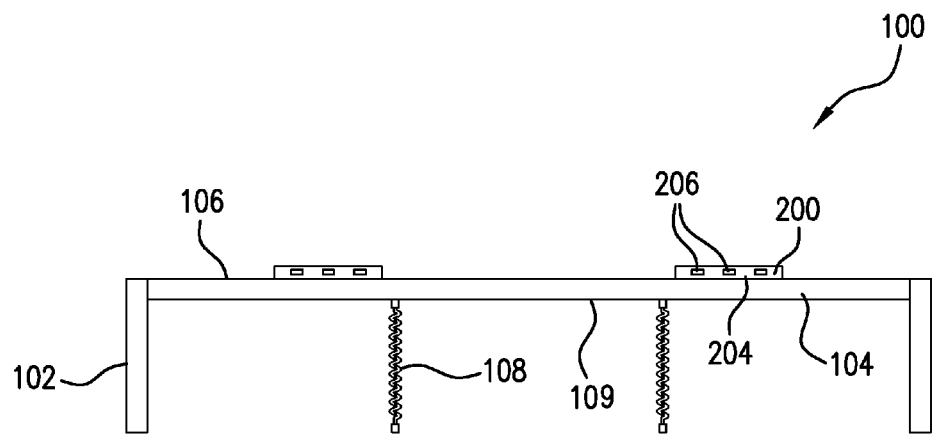
FIG. 5 shows a side view of a table according to an embodiment.
Figure 8:
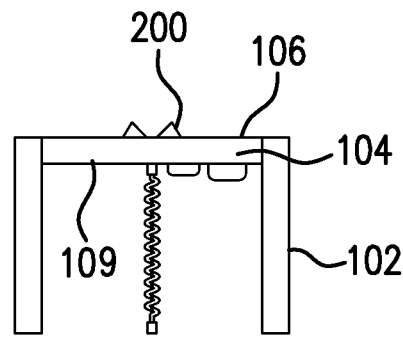
FIG. 8 shows a side view of a table according to an embodiment.
Figure 9:
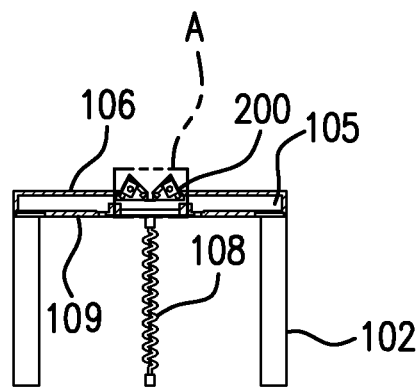
FIG. 9 shows a cross-sectional view of a table according to an embodiment.

FIGS. 5, 8, and 9 show side views of an embodiment of table 100 when port housings 200 are in the second position. As shown in FIG. 5, electrical ports 206 are accessible above table top surface 106. This allows a user to access electrical ports 206. In some embodiments table 100 may include at least one cord 108 extending from table top 104 for supplying data and/or power to table 100 and port housings 200.

Figure 4:
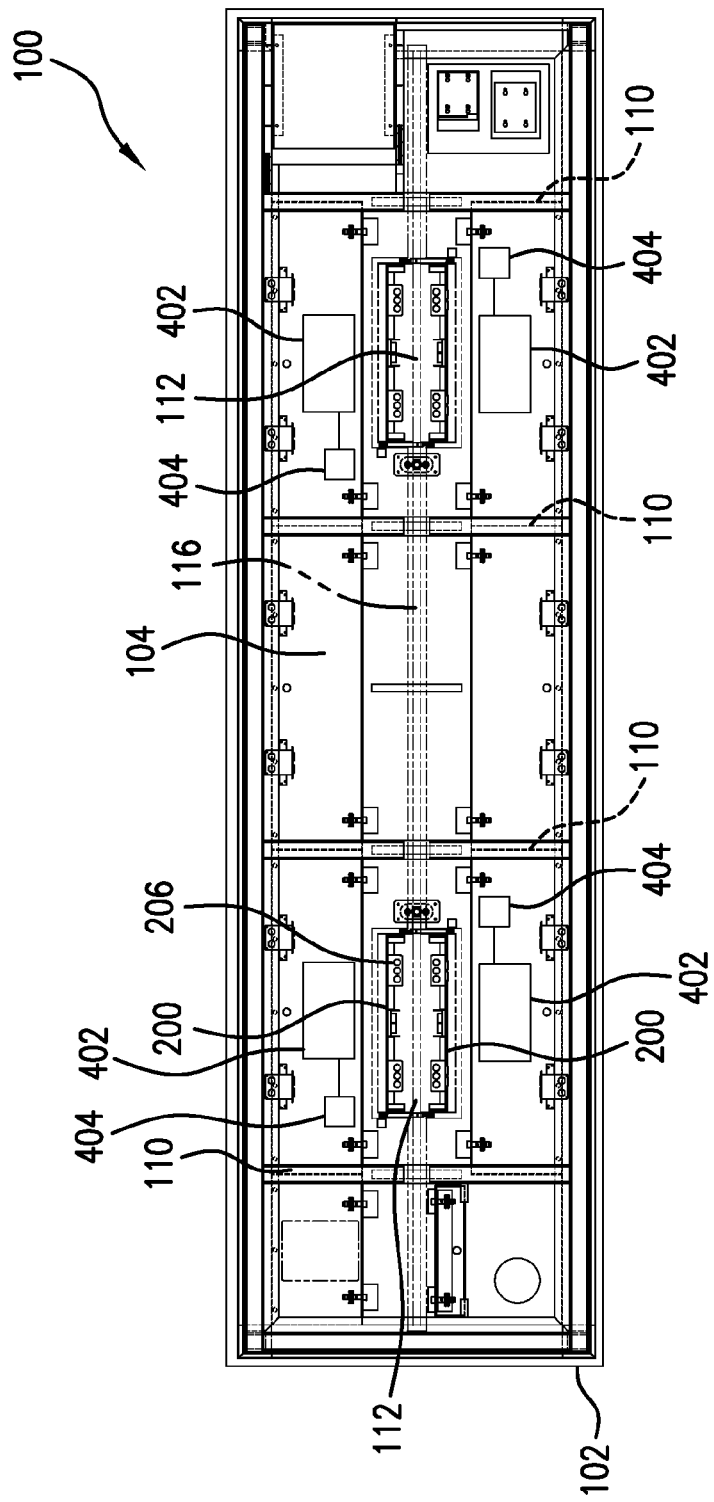
FIG. 4 shows an aerial transparent view of a table according to an embodiment.

In some embodiments, as shown in FIGS. 1-4, table 100 may include four port housings 200, which may be located on table 100 in pairs. Each pair may include two port housings 200 disposed in a back-to-back configuration. In such a configuration, the two port housings 200 in each pair may be configured to rotate in opposite directions when moving between the first position and the second position. In other words, the two port housings in each pair may be configured to rotate such that their respective functional surfaces 204 face away from each other toward opposite sides of table 100 when in the second position (see, for example, FIGS. 8-10). As shown in FIG. 4, apertures 112 for receiving port housings 200 may be located between cross-supports 110. Furthermore, table 100 may include an opening 116 extending across at least a portion of table top 104. Opening 116 may provide space for allowing port housings 200 to rotate between the first position and the second position. In some embodiments, opening 116 may include at least one brush 114. Brush 114 may be located anywhere in opening 116 for providing an aesthetically pleasing table surface. For example, to hide brush 114 from view, it may be recessed from table top surface 106. Brush 114 allows additional cords or cables to pass though it and serves to conceal at least a portion of the additional cords or cables below table 100.

Figure 10:
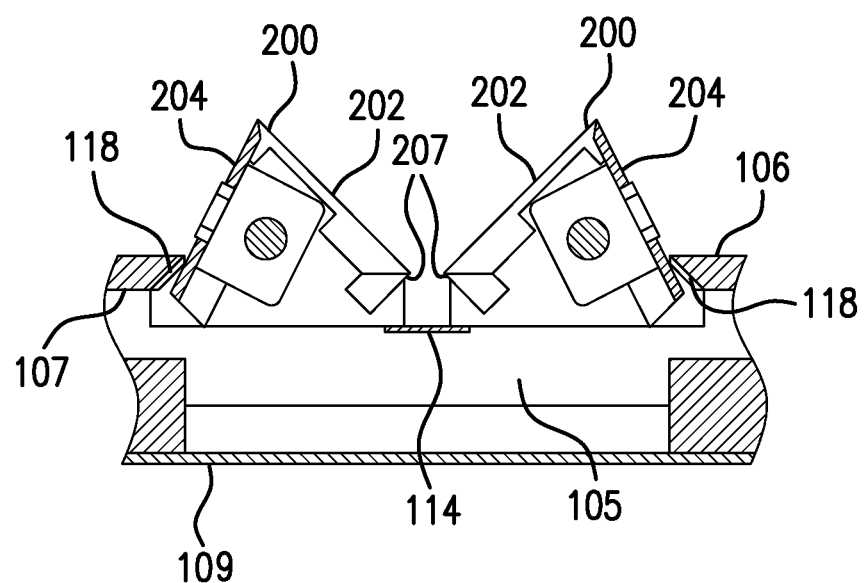
FIG. 10 shows a zoomed in view of area A in FIG. 9.

As shown in FIG. 10, opening 116 allows a pair of port housings 200 to be located in a back-to-back configuration and allows the pair of port housings 200 to rotate in opposite directions without interfering with each other or with a portion of table top 104. Opening 116 defines a void between rear sides 207 of port housings, where no portion of table top surface 106 is disposed. As also shown in FIG. 10, apertures 112 may include at least one beveled edge 118 extending from table top surface 106 to bottom surface 107. Beveled edge 118 may facilitate rotation of port housings 200 between the first and second positions by providing space for port housing 200 as it goes through its rotation, and may help maintain reliable positioning of port housing 200 in the second position by acting as a bumper against which a lower portion of functional surface 204 can register to prevent further rotation.

Though FIGS. 1-4 show four port housings 200 located on table 100 in pairs, table 100 could include any number of port housings 200, arranged in pairs or not. For example, table 100 could include a single port housing 200, one pair of port housings 200, or three pairs of port housings 200. Furthermore, though FIGS. 1-4 show port housings 200 all aligned in the same direction, table 100 may include port housings 200 aligned in different directions.

In some embodiments, table 100 includes at least one sensor module 402 coupled to table 100 and in communication with a controller 404. Controller 404 is configured to detect signals from sensor modules 402 and control the rotation of port housings 200 between the first and second positions based on the detected signals. In some embodiments, controller 404 may use a processor to perform these detection and control operations. In some embodiments, controller 404 is coupled to a motor 302 (described in detail with reference to FIGS. 11-15) and is configured to control the operation of motor 302 for rotating port housings 200 between the first and second positions. In some embodiments, a sensor module 402 is provided for each port housing 200 located on table 100. Providing a sensor module 402 for each port housing 200 allows each port housing 200 to be controlled independently. In other words, a single port housing 200 can be rotated from the first position to the second position while another port housing 200 remains in the first position (see, for example, FIG. 16). In some embodiments, table 100 may be provided with a single sensor module 402 for rotating all the port housings 200 at once. Table 100 could be provided with any number of sensor modules 402 in communication with any number of port housings 200. Furthermore, though FIG. 4 shows a separate controller 404 for each sensor module 402, table 100 may be provided with a single controller in communication with all the sensor modules 402.

Types of sensors that may be used in accordance with the embodiments described herein include, but are not limited to, fingerprint sensors, radio-frequency identification (RFID) sensors, weight sensors, motion sensors, capacitive touch sensors, device state sensors, and bar code (including quick response (QR) code) scanners. A motion sensor may send a signal in response to sensing the motion of an object, such as a hand. A capacitive touch sensor may send a signal in response to sensing a touch, for example, the touch of a finger. A weight sensor may send a signal upon sensing a weight above or below a threshold weight. A device state sensor may send a signal in response to sensing a certain electronic device state, such as the battery life or the wireless signal strength of an electronic device. An RFID sensor may send a signal upon sensing identification information on an employee's or technical assistant's RFID card. A bar code scanner may send a signal upon reading a bar code associated with an employee or technical assistant.

Sensors such as fingerprint sensors, RFID sensors, or bar code readers may provide increased security within a retailer's store. Such sensors would prevent electrical ports 206 from being deployed and accessed by an unauthorized person and could inhibit unauthorized use of power and/or data within the store. In some embodiments, sensor modules 402 may be located on table 100. For example, sensor modules 402 may be located on table top surface 106, on bottom surface 107, and/or on bottom panel 109. In some embodiments, sensor modules 402 may not be located on table 100. For example, sensor modules 402 may be located on a wall or chair near table 100, or other remote locations.

Figure 11:
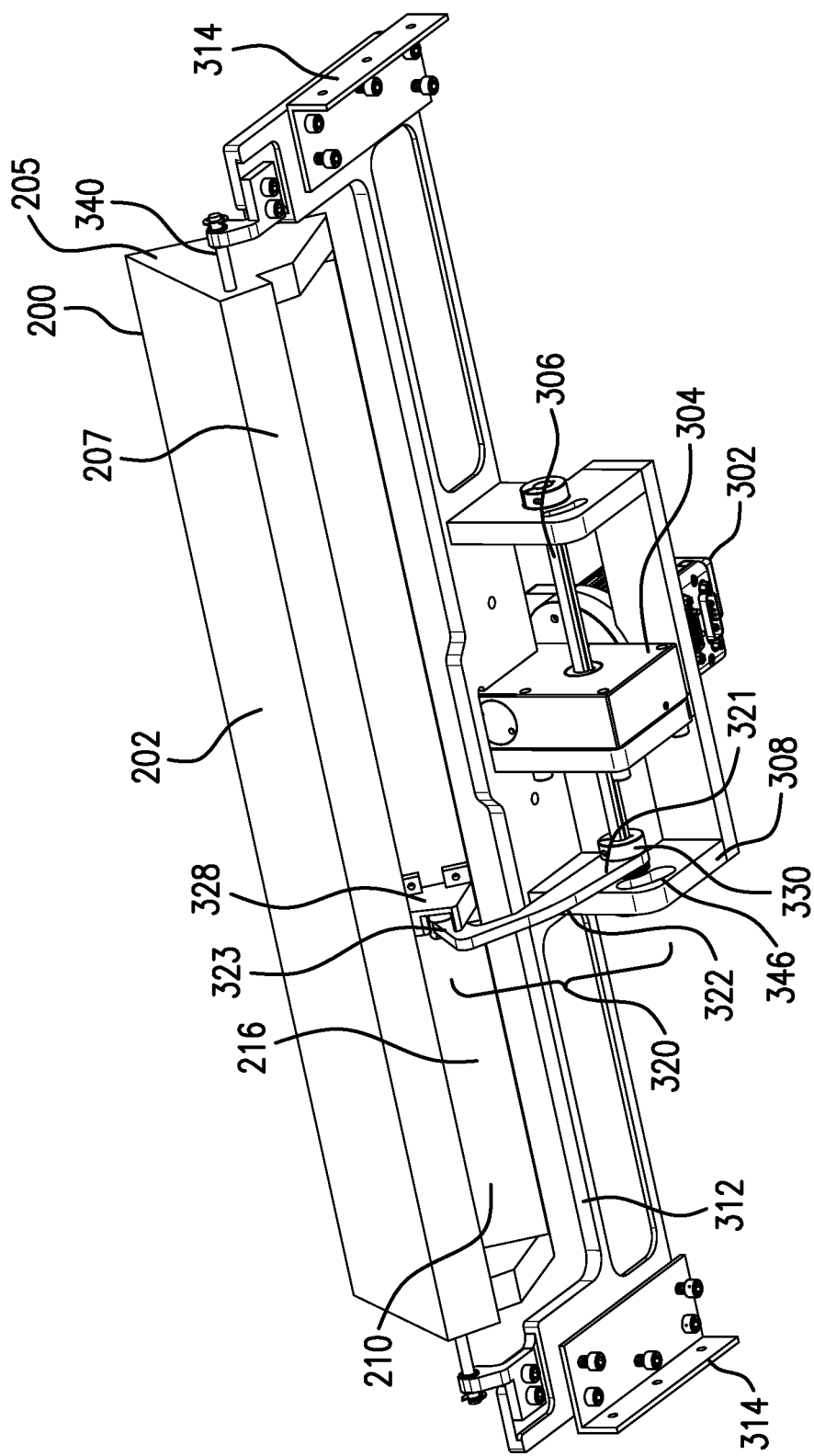
FIG. 11 shows a perspective view of an assembly and a port housing according to an embodiment.
Figure 12:
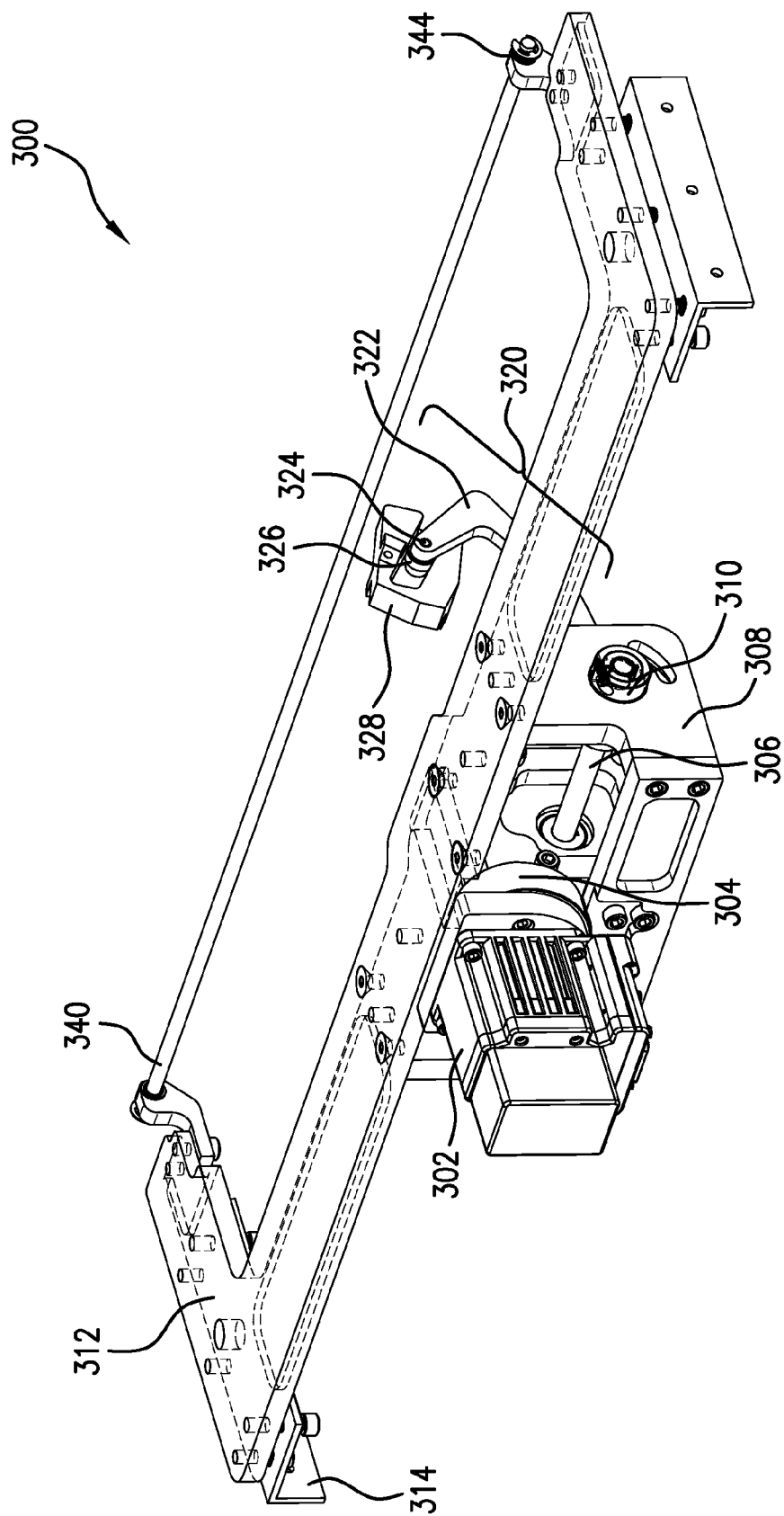
FIG. 12 shows a perspective view of an assembly according to an embodiment.

An assembly 300 for rotating port housing 200 between the first and second positions according to some embodiments is shown in FIGS. 11 and 12. FIG. 11 shows port housing 200 connected to assembly 300 and FIG. 12 shows assembly 300 without port housing 200.

Assembly 300 includes a motor 302, a gear box 304, and a drive shaft 306 for rotating port housing 200 between the first and second positions. Motor 302, gear box 304, and drive shaft 306 are secured to a support block 308, which is attached to a frame 312. Drive shaft 306 is attached to support block 308 via bearing 310, which allows drive shaft 306 to rotate relative to support block 308.

Frame 312 may be attached to bottom surface 107 within cavity 105 of table top 104 via mounting brackets 314. Frame 312 and mounting brackets 314 may include any type of fastening mechanism to effect this attachment, such as, but not limited to, clamps, screws, adhesive, and welding. Preferably, mounting brackets 314 are adjustable to allow for precise positioning of assembly 300 when assembly 300 is installed on table 100. Adjustable positioning of assembly 300 ensures that port housing 200 can be properly aligned to ensure that top surface 202 will be flush with table top surface 106 in the first position. Adjustable positioning also allows for adjustments needed to compensate for minor machining and/or assembly errors (e.g. typical dimensional tolerances) in table 100, port housing 200, and/or assembly 300. Frame 312 and mounting brackets 314 may include any type of adjusting mechanism to effect this adjustment, such as, but not limited to, one or more set screws (as shown in FIG. 11), shims, or slotted fasteners.

In some embodiments motor 302 may be, but is not limited to, a brushless DC motor having controlled loop feedback. Controlled loop feedback provides an additional safety feature for table 100. Controlled loop feedback prevents port housings 200 from closing on objects on table top surface 106, such as a person's finger or a cord. A motor having controlled loop feedback senses the force required to rotate drive shaft 306. If this force exceeds a specific limit (e.g., because a person's finger is blocking port housing 200 from moving from the second position to the first position), the motor stops, and in some embodiments may reverse the rotation of drive shaft 306. This prevents injury to customers or employees and prevents damage to the components of assembly 300. Additionally, closed loop feedback prevents a motor from attempting to rotate port housing 200 to the second position when an object (e.g., a laptop) is lying on top of top surface 202. This prevents stress on the motor and damage to the components of assembly 300.

As shown in FIG. 11, a linkage 320 couples port housing 200 to drive shaft 306. Linkage 320 is configured to rotate port housing 200 between the first and second positions in response to rotational movements of drive shaft 306. In some embodiments, motor 302 and gear box 304 are configured to rotate drive shaft 306 in response to a signal detected from a sensor module 402. Linkage 320 may include a curved finger 322 having a first end 321 and a second end 323. First end 321 may include a coupling 330 for attaching curved finger 322 to drive shaft 306. In some embodiments first end 321 is coupled to drive shaft 306 non-rotatably, so that curved finger 322 rotates along with drive shaft 306. Second end 323 may include a guide shaft 324 and a guide bearing 326 for attaching curved finger 322 to a cam guide 328. Cam guide 328 may be attached to port housing 200 and is designed to guide rotation of port housing 200 by curved finger 322. Cam guide 328 may include a groove 332 for receiving guide bearing 326 that is configured to slide within groove 332. Upon rotation of drive shaft 306, and concurrent rotation of curved finger 322, cam guide 328 raises or lowers port housing 200 through force applied to groove 332 as cam guide slides within groove 332.

Figure 13:
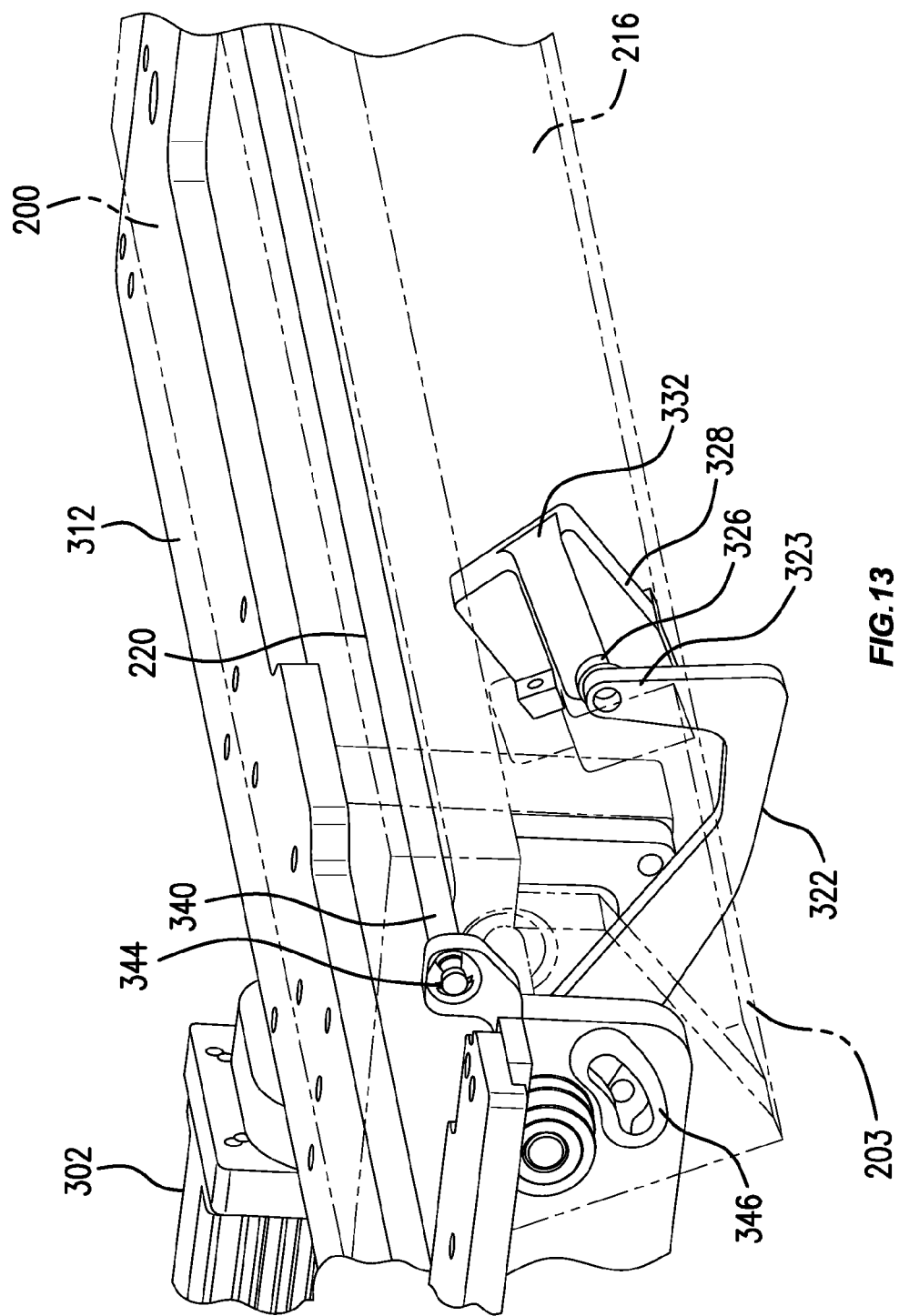
FIG. 13 shows a transparent view of an assembly and a port housing according to an embodiment.
Figure 14:
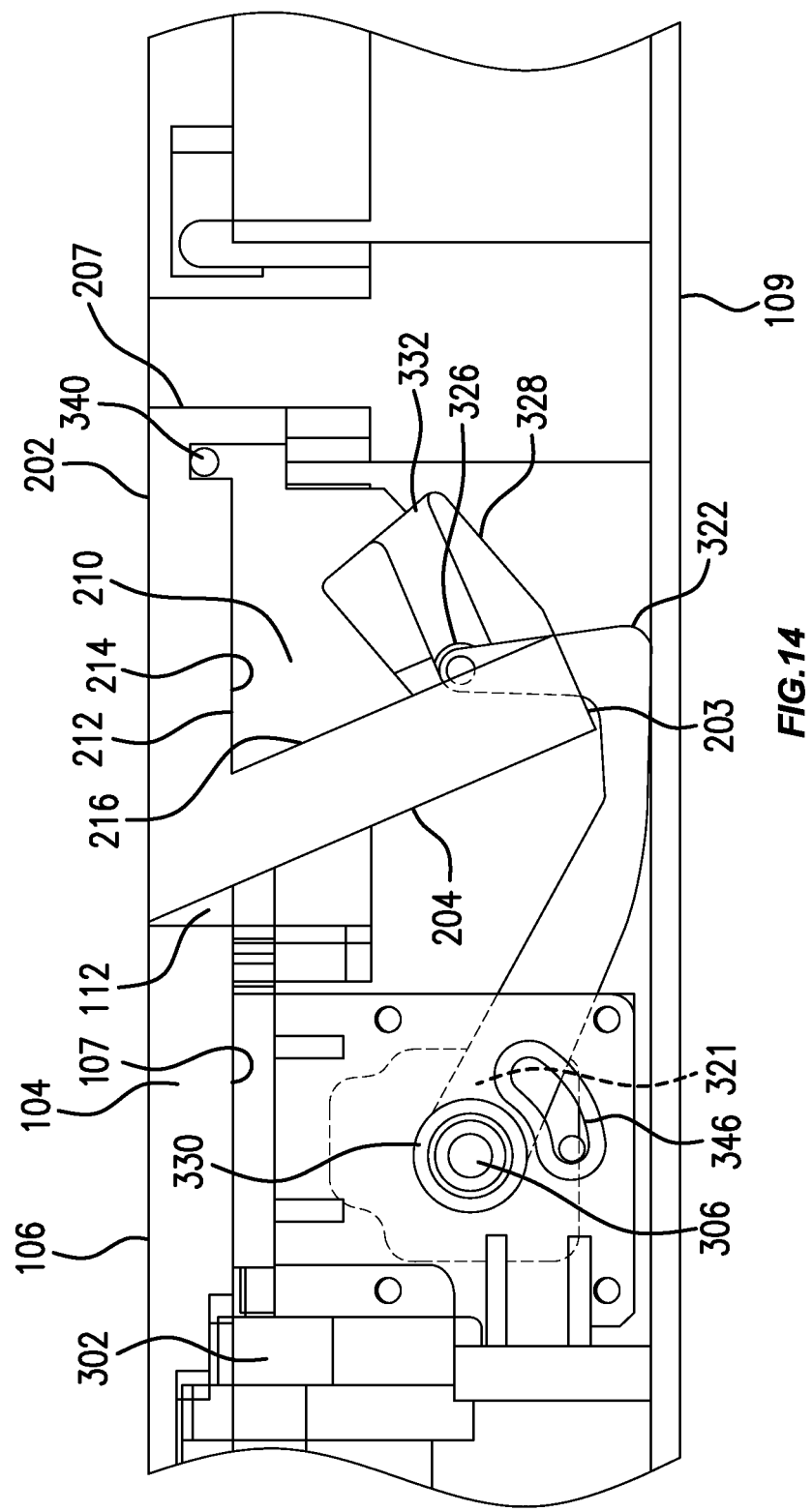
FIG. 14 shows a cross-sectional view of an assembly and a port housing according to an embodiment.

As shown in FIG. 11, curved finger 322 has a curved shaped generally in the shape of a "C." "Curved" is used herein to mean that the finger has a first end and a second end separated by a non-linear body along at least one side thereof between attachment points of the finger. The non-linear body may have a continuous curvature or a non-continuous curvature (e.g., formed in part of straight segments each individually having no curvature at all as shown in FIGS. 11 and 14). Curved finger 322 is not limited to a "C-shape," but may have any curved shape, including other curved shapes that curve back upon themselves to form a concave recess along their lengths, including, but not limited to, a U-shape, a J-shape, etc. The shape of finger 322 in FIGS. 11-15 is exemplary. A curved finger according to embodiments of this invention may take other curved forms in order to perform the functions described herein, including, for example, allowing assembly 300 to be positioned at a front side of housing 200 by extending around interfering portions of table 100, as described in greater detail elsewhere herein.

Assembly 300 may also include a support bar 340 for supporting port housing 200. Support bar 340 may be attached to frame 312 via a connection 344. Connection 344 may be a fixed connection or a rotatable connection (e.g., rotatable via a bearing). In some embodiments, assembly 300 includes a single support bar 340 that extends through a through hole 220 extending through port housing 200. In some embodiments, assembly 300 may include more than one support bar, each of which extend partially into opposite sides of through hole 220. The use of a single support bar 340 helps equally distribute load along port housing 200 for uniform rotation and consistent alignment. A single support bar 340 also increases the robustness of assembly 300 and prevents racking by reducing the number of parts in assembly 300. Reducing the number of parts reduces the number of joints between parts, which reduces the number of possible failure points in assembly 300.

FIG. 11 shows a port housing 200 according to an embodiment in which port housing 200 has the general shape of a triangular prism and is defined by top surface 202, a rear side 207, functional surface 204, and a side wall 205. Top surface 202, functional surface 204, and side wall 205 define the portion of port housing 200 that is deployed above table top surface 106 in the second position. This shape and configuration of port housing 200 allows port housing 200 to appear as a solid block when exposed above table top surface 106. While FIG. 11 shows port housing 200 in the shape of a triangular prism, port housing 200 may have other shapes allowing for a flat surface when stowed in the first position.

In some embodiments, port housing 200 is molded or machined from a single block of material. In some embodiments port housing includes multiple pieces fixed together using adhesives and/or mechanical fasteners to form the impression of a solid block when viewed from above the table in either of the first and second positions. Port housing 200 can be made from materials including, but not limited to, wood, metals, plastics, or composite materials.

Figure 15:
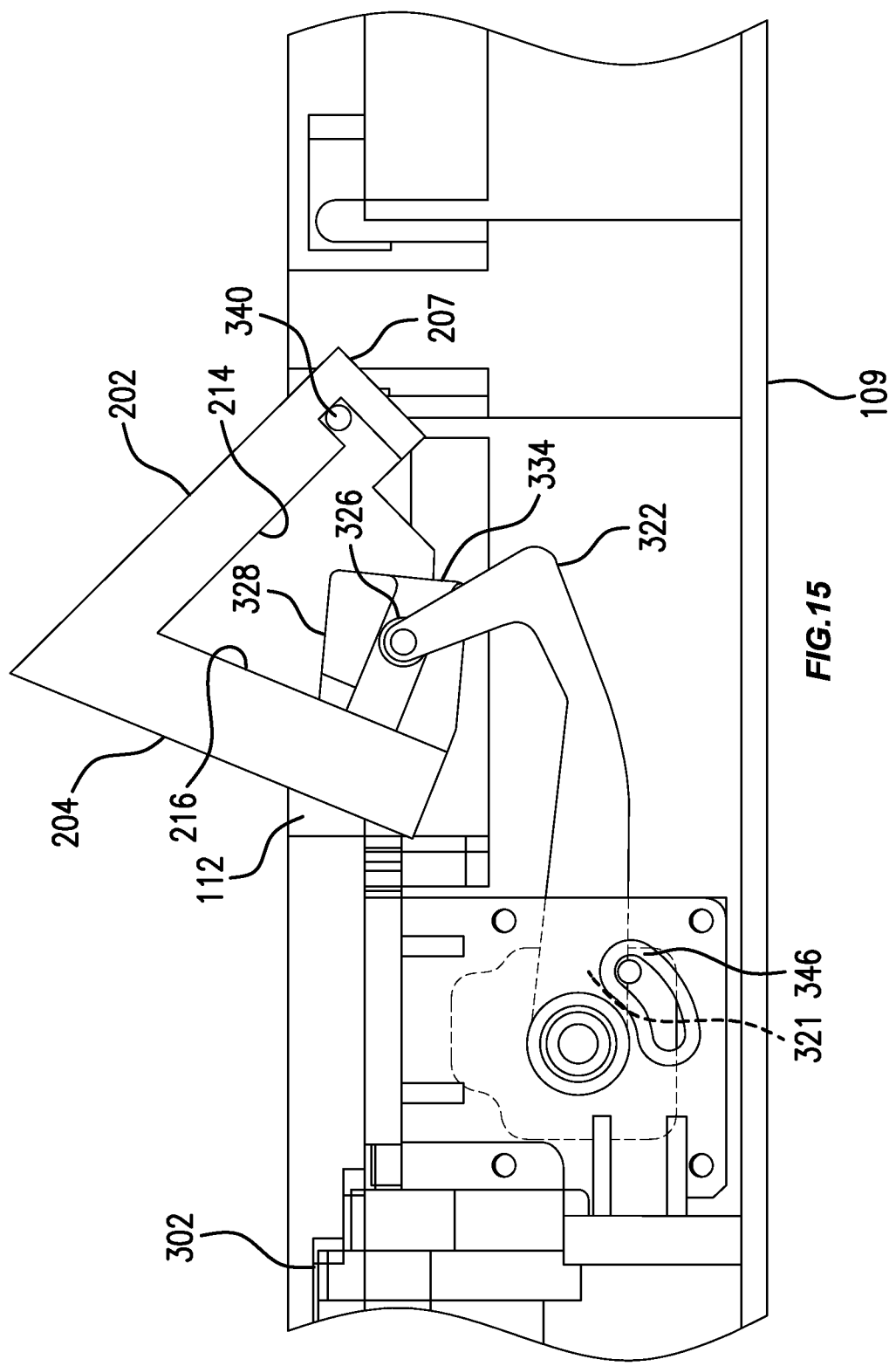
FIG. 15 shows a cross-sectional view of an assembly and a port housing according to an embodiment.

In some embodiments, port housing 200 includes a cavity 210 behind top surface 202 and functional surface 204. As shown in FIGS. 14 and 15, cavity 210 may include a cavity wall 212 having a first surface 214 and a second surface 216. In some embodiments, first surface 214 is oriented at an angle of less than 90° relative to top surface 202. In some embodiments, first surface 214 is oriented at an angle of 0° relative to top surface 202 (i.e., first surface 214 is parallel to top surface 202). In some embodiments, second surface 216 is oriented at an angle of less than 90° relative to functional surface 204. In some embodiments, second surface 216 is oriented at an angle of 0° relative to functional surface 204 (i.e., second surface 216 is parallel to functional surface 204).

In some embodiments, second end 323 of curved finger 322 is attached to cam guide 328, which is attached to second surface 216. In some embodiments cam guide 328 is attached in the middle half of second surface 216. In some embodiments cam guide 328 is attached in the middle third of second surface 216. As shown in FIGS. 13-15, curved finger extends from drive shaft 306 to cam guide 328 and warps around a bottom side 203 of port housing 200 in both the first and second positions. In other words, curved finger 322 extends from drive shaft 306, around bottom side 203, and into cavity 210 in both the first and second positions. The shape and configuration of curved finger 322 allows most of the components of assembly 300, including motor 302, gear box 304, and drive shaft 306 to be located on a single side of port housing 200 opposite the axis of rotation of port housing about support bar 340.

As shown in FIGS. 13-15, motor 302, gear box 304, and drive shaft 306 may all be located on the side of port housing 200 adjacent to functional surface 204. Arranging motor 302, gear box 304, and drive shaft 306 on the side of port housing 200 adjacent to functional surface 204 may be beneficial for various reasons. For example, it allows two port housings 200 to be arranged in pairs in a back-to-back configuration as described above with respect to FIGS. 1-10. In this configuration the distance between rear sides 207 of paired port housings 200 may be less than a width of motor 302, gear box 304, and drive shaft 306, measured in the same direction.

Also for example, it allows concealment of assembly(ies) 300 underneath table top 104. Since motor 302, gear box 304, and drive shaft 306 can be positioned on the side of port housing 200, and not below it, these components can be concealed within table top 104, even when table top 104 has a relatively shallow depth (e.g., 4½ inches). In some embodiments, the thickness of table top 104 is between 3½ inches and 5 inches. This also allows these components to be positioned directly adjacent bottom surface 107, which helps prevent them from being seen or interfered with by customers or oilier users of the table. Furthermore, in embodiments including bottom panel 109, this allows these components to fit completely within cavity 105 between bottom surface 107 and bottom panel 109 (see, e.g., FIG. 6).

Also for example, the arrangement of assembly 300 and configuration of curved finger 322 creates a compact design that can be installed into an existing table without excess modification of the table. The assembly can be fit into small areas beneath a table that may not interfere with the existing structure of the table. Additionally, curved finger 322 can wrap around existing structures present on bottom surface 107, such as paneling or electronics. All these features of assembly 300 reduce the amount of modification needed to install assemblies 300 onto existing table designs and reduce the possibility that old table designs would need to be replaced completely for failing to accommodate port housing 200 and assembly 300.

While FIGS. 13-15 have been described as having a single linkage 320 having a single curved finger 322 and cam guide 328, assembly 300 may include multiple linkages 320. For example, assembly 300 may include two linkages 320 each having a curved finger 322 and a cam guide 328. In such an embodiment, each cam guide 328 may be attached to second surface 216. Each cam guide 328 may be attached within the middle half of second surface 216.

The operation of assembly 300 according to an embodiment will now be described in reference to FIGS. 14 and 15. FIG. 14 shows port housing 200 in the first position with top surface 202 flush with table top surface 106. As shown in FIG. 14, functional surface 204 of port housing 200 is hidden from view within aperture 112 located in table top 104. In the first position, guide bearing 326 is in a first location within groove 332. In response to a first signal from a sensor module 402, motor 302 and gear box 304 rotate drive shaft 306 and port housing 200 is rotated to the second position as shown in FIG. 15. Port housing 200 rotates about support bar 340, thereby causing at least a portion of functional surface 204 to be deployed above table top surface 106.

During rotation of port housing 200 from the first position to the second position, drive shaft 306 forces curved finger 322 upward. As curved finger 322 is forced upward, guide bearing 326 slides within groove 332 to a second location, thereby translating the upward movement of curved finger 322 into the rotational movement of port housing 200. A hard stop 346 located on support block 308 may be configured to stop the rotation of port housing 200 at specific points corresponding to the first and second positions. This ensures that top surface 202 is always flush with table top surface 106 in the first position. This also ensures that the portion of functional surface 204 deployed above table top surface 106 is the same each time port housing 200 is rotated to the second position. Alternatively or additionally, a limit switch may provide an electrical signal which stops the rotation of port housing 200 at the specific points.

When sensor module 402 sends a second signal, motor 302 and gear box 304 rotate drive shaft 306 again, this time in the opposite direction. This causes port housing 200 to return to the first position as shown in FIG. 14. During the rotation of port housing 200 from the second position to the first position, drive shaft 306 forces curved finger 322 downward, thereby returning functional surface 204 to its concealed position below table top surface 106. As curved finger 322 is forced downward, guide bearing 326 slides within groove 332 and returns to the first location within the groove.

While the operation depicted in FIGS. 14 and 15 is described as reversibly rotating port housing 200 between two discrete positions, port housing 200 may be rotated to any number of positions in response to sensor signals. For example, functional surface 204 may be deployed at various positions. In other words, motor 302 and gear box 304 may be configured to rotate port housing 200 such that it extends from table top surface 106 at various heights or degrees of rotation.

Sensor module 402 may be a sensor configured to sense a value or other criteria based on an external source. Sensor module 402 may also include (physically or by communication therewith) a processor capable of interpreting signals from the sensor and determining whether threshold criteria are met. Sensor module 402 may transmit signals as described elsewhere herein based upon whether such criteria are met.

In some embodiments, port housing 200 may be rotated between the first and second positions in response to a first signal or a second signal from sensor module 402, where sensor module 402 is a weight sensor. In such embodiments, sensor module 402 may be embedded table top 104 or placed on table top surface 106. The weight sensor may be configured to send the first signal in response to sensing the weight of an electronic device. For example, the weight sensor may send the first signal when an electronic device, such as a laptop, tablet, or cellphone is placed on the sensor, where the electronic device has a weight above a threshold value. In operation, the weight sensor may send the first signal upon sensing the weight of the electronic device being above the threshold value. In response to the first signal, controller 404 may rotate drive shaft 306 in a first direction, thereby causing port housing 200 to rotate into the second position as discussed above in reference to FIGS. 14-15. When the user picks up the electronic device the weight sensor may send a second signal to controller 404 in response to the sensed weight dropping below the threshold value. In response to receiving the second signal, controller 404 may rotate the drive shaft in a second direction, opposite the first direction, thereby causing port housing 200 to return to the first position. Controller 404 may wait a specified amount of time, for example 30 seconds, before rotating port housing 200 to the first position. This allows a user to temporarily pick up an electronic device without causing port housing 200 to return immediately to the first position.

In some embodiments, port housing 200 may be rotated between the first and second positions in response to a first signal or a second signal from sensor module 402, where sensor module 402 is a device state sensor. The device state sensor may be configured to receive a signal from an electronic device received directly through a wireless connection, such as Bluetooth®, or through communication with the electronic device through a network such as the Internet or a local wireless network. The signal received by the device state sensor may be related to, for example, location, battery life, wireless signal strength, and/or the software status (e.g., software out-of-date and/or malfunctioning) of an electronic device. In such embodiments, the device state sensor may be located on, for example, table top surface 106, bottom surface 107, a wall near table 100, the ceiling above table 100, a chair near table 100, or other remote locations.

In operation, the device state sensor may be configured to sense a device state and send a first signal to controller 404 upon sensing that the device state is below a certain threshold in order to make available power to recharge it. For example, device state sensor may send a first signal to controller 404 when the battery life of an electronic device is below 10%. In response to the first signal, controller 404 may rotate drive shaft 306 in a first direction, thereby causing port housing 200 to rotate into the second position as discussed, above in reference to FIGS. 14 and 15. The device state sensor may send a second signal to controller 404 after the electronic device's battery is no longer below a threshold level (i.e., after the device is fully charged), after the device is unplugged from an electrical port 206 of port housing 200, or both. In response to receiving the second signal, controller 404 may rotate drive shaft 306 in a second direction, opposite the first direction, thereby causing port housing 200 to return to the first position. For example, if a device charges to X % full power and is then unplugged, controller 404 may cause port housing 200 to return to the first position in response to detecting that the device has been unplugged if X % is above the threshold level. In some embodiments, if X % full power is below the threshold level, controller 404 may keep port housing 200 in the second position even after the device is unplugged. In some embodiments, controller 404 may cause port housing 200 to return to the first position in response to detecting that the device has been unplugged regardless of the device's power level.

Also for example, the first signal may be sent to and acted upon similarly by controller 404 in response to a determination that a device's wireless Internet signal is below (or above) a threshold level as sensed by sensor module 402, in order to make available (or stow) a network port for Internet access. Also for example, the first signal may be sent to and acted upon similarly by controller 404 in response to a determination that a device's software is out-of-date (or up-to-date) as sensed by sensor module 402, in order to make available (or stow) a data port to receive a software update. Also for example, the first signal may be sent to and acted upon similarly by controller 404 in response to a determination that a device is malfunctioning (or operating properly) as sensed by sensor module 402, in order to make available (or stow) a data port for diagnosing and addressing the malfunction. In some embodiments, the first signal may be sent based on a device state as described herein, in combination with the device location. For example, when criteria for sending the first signal is met with respect to a particular electronic device (as sensed by sensor module 402), sensor module 402 may only send the first signal to the controller 404 that controls port housing 200 closest to the electronic device. In some embodiments, controller 404 may cause a port housing 200 to return to the first position upon detecting that nothing is plugged into the electrical ports 206 on port housing 200. For example, if a user plugs in a data cord to update the software on an electronic device and subsequently unplugs the data cord, controller 404 may cause port housing 200 to return to the first position upon receiving a second signal indicating that the software has been updated and/or upon detecting that the data cord has been unplugged.

In some embodiments, port housing 200 may be rotated between the first and second positions in response to a first signal and a second signal from sensor module 402, where sensor module 402 is a motion sensor or a capacitive touch sensor. In such embodiments, the motion or touch sensor may be embedded within table top 104, or located on table top surface 106 or bottom surface 107, or coupled to a surface of or embedded within a wall or chair near table 100. The motion or touch sensor may be configured to send a first signal to controller 404 in response to a first motion (e.g., a hand wave motion in front of a sensing element thereof) or a first physical touch (e.g., on a sensing surface thereof). In response to the first signal, controller 404 may rotate drive shaft 306 in a first direction, thereby causing port housing 200 to rotate into the second position as discussed above in reference to FIGS. 14 and 15. The motion or touch sensor may send the second signal when it senses a second motion or touch. In response to receiving the second signal, controller 404 may rotate drive shaft 306 in a second direction, opposite the first direction, thereby causing port housing 200 to return to the first position.

In some embodiments, port housing 200 may be rotated between the first and second positions in response to a first signal and a second signal from sensor module 402, where sensor module 402 is a barcode (including quick response (QR) code) or radio frequency identification (RFID) scanner. In such embodiments, the scanner may be embedded within table top 104, or located on table top surface 106 or bottom surface 107, or coupled to a surface of or embedded within a wall or chair near table 100. The scanner may be configured to read bar codes or RFID chips associated with a person or device (e.g., store employees, such as salespeople and technical support personnel). The scanner may be configured to send the first and second signals in response to scanning a barcode or RFID chip associated with authorized personnel. In response to the first signal, controller 404 may rotate drive shaft 306 in a first direction, thereby causing port housing 200 to rotate into the second position as discussed above in reference to FIGS. 14 and 15. In response to receiving the second signal, controller 404 may rotate drive shaft 306 in a second direction, opposite the first direction, thereby causing port housing 200 to return to the first position.

In some embodiments, table 100 may include or may be coupled to various types of sensor modules 402 for rotating port housings 200 between the first and second positions. For example, table 100 may include one or more device state sensors and one or more touch sensors. In such an embodiment, the device state sensors may automatically rotate port housings between the first and second positions in response to receiving device signals, but direct-interaction sensors such as the touch sensors would allow port housings 200 to be rotated as desired by a user. In some embodiments, table 100 does not include a sensor, but operation of motor 302 as described is controlled directly by a physical button or switch, actuation of which takes the place of sending the first and second signals.

Figure 16:
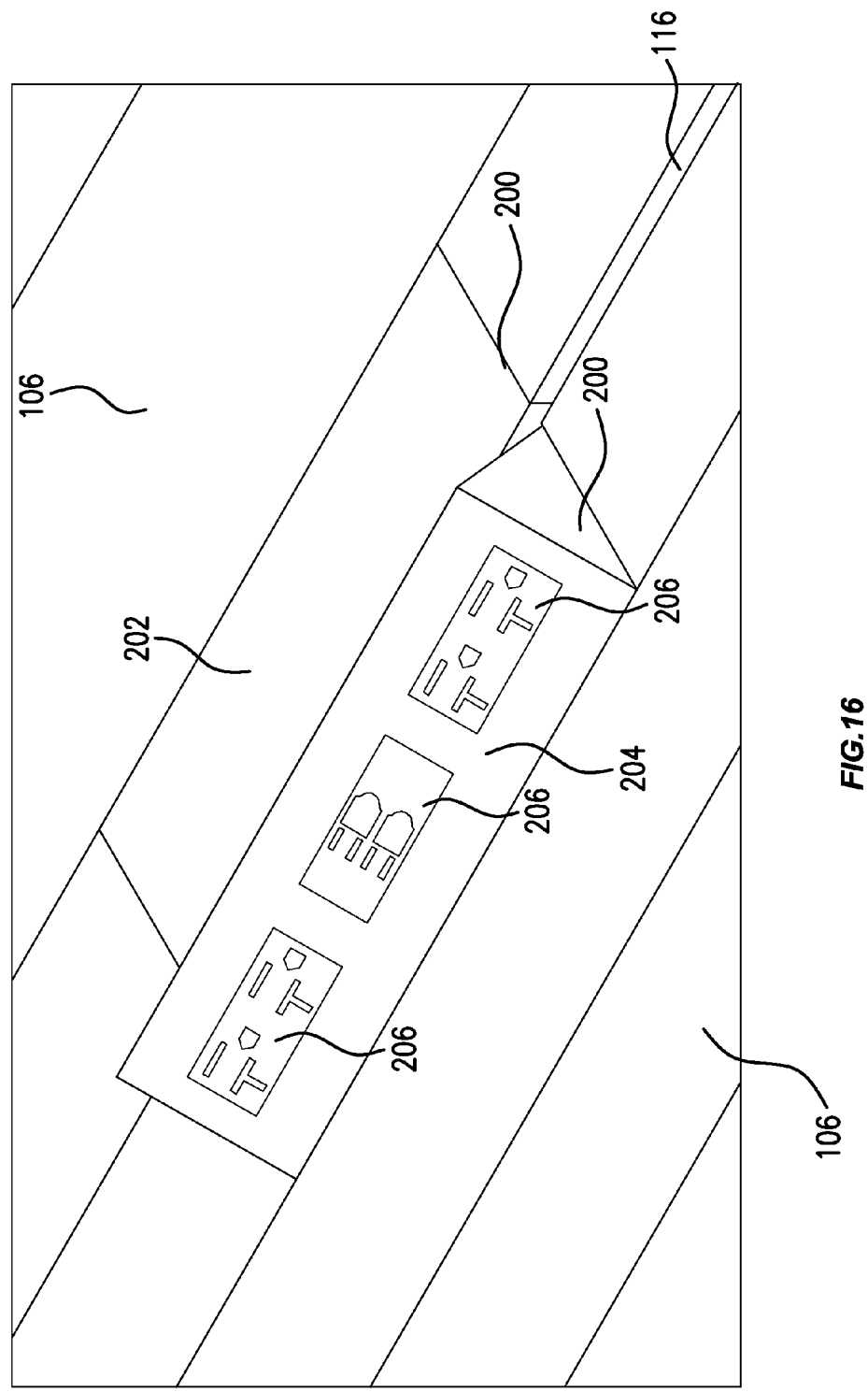
FIG. 16 shows a table according to an embodiment.
Figure 17:
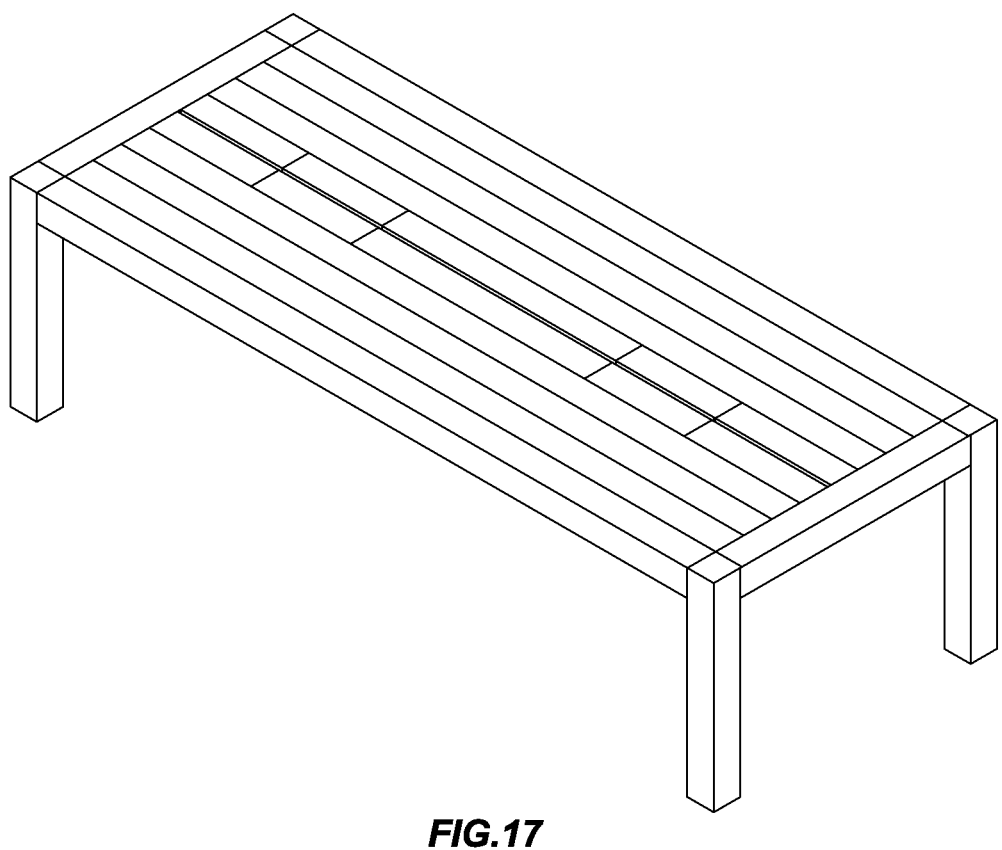
FIG. 17 shows a top front perspective view of a table showing our new design in a first state.
Figure 18:
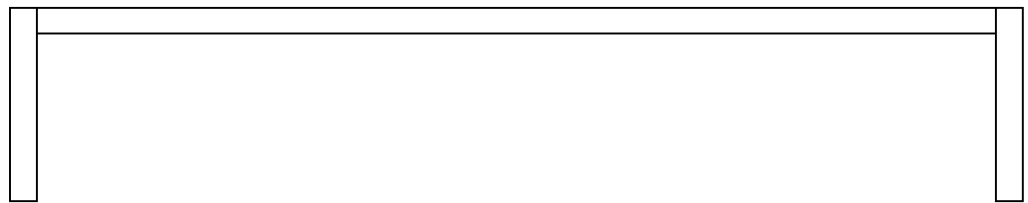
FIG. 18 shows a front view thereof in the first state.
Figure 19:
FIG. 19 shows a rear view thereof in the first state.
Figure 20:
FIG. 20 shows a left side view thereof in the first state.
Figure 21:
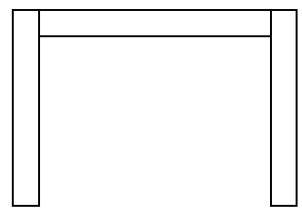
FIG. 21 shows a right side view thereof in the first state.
Figure 22:
FIG. 22 shows a top view thereof in the first state.
Figure 23:
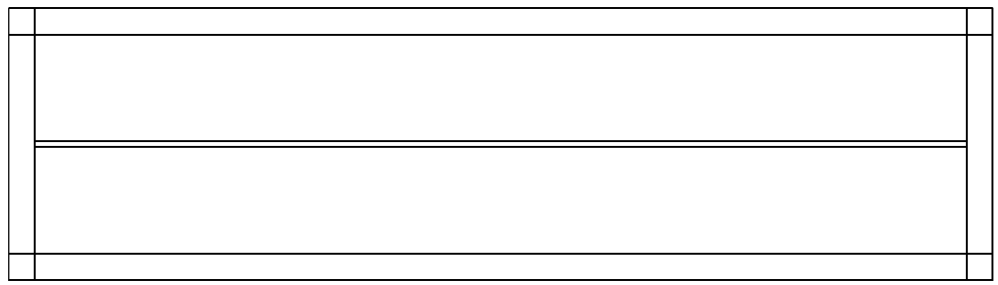
FIG. 23 shows a bottom view thereof in the first state.
Figure 24:
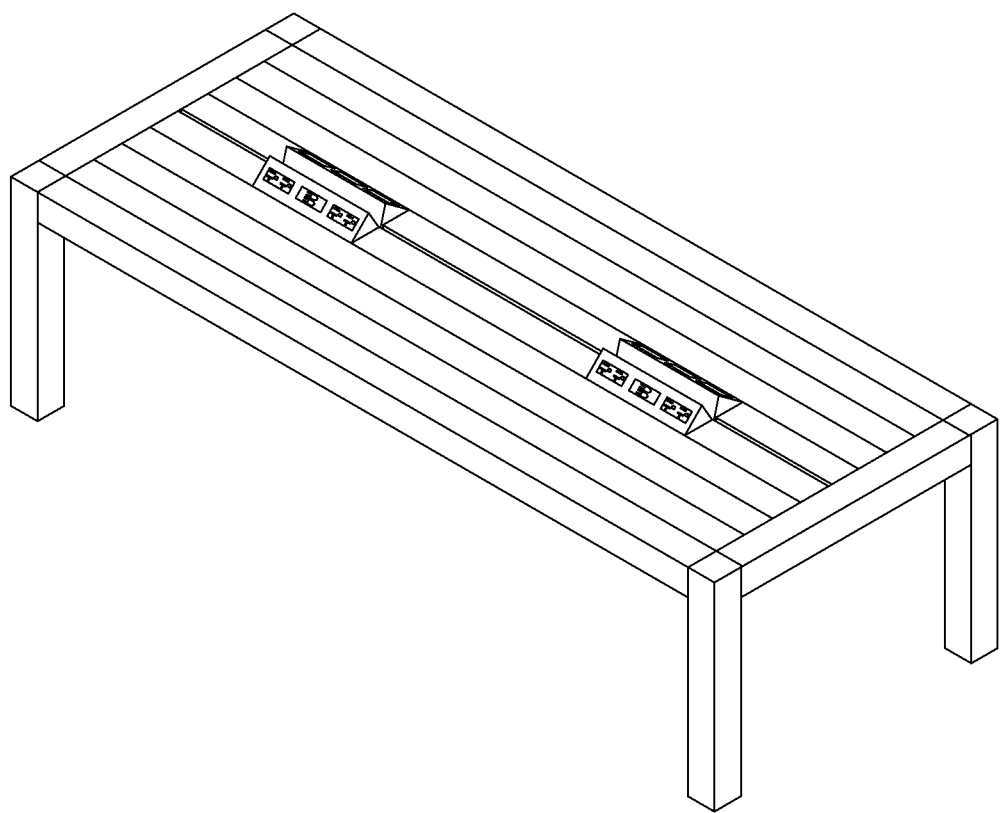
FIG. 24 shows a top front perspective view thereof in a second state.
Figure 25:
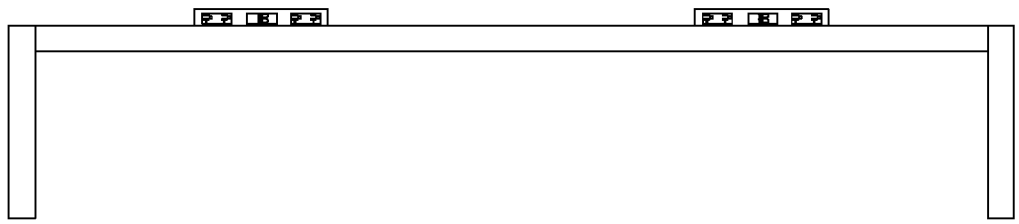
FIG. 25 shows a front view thereof in the second state.
Figure 26:
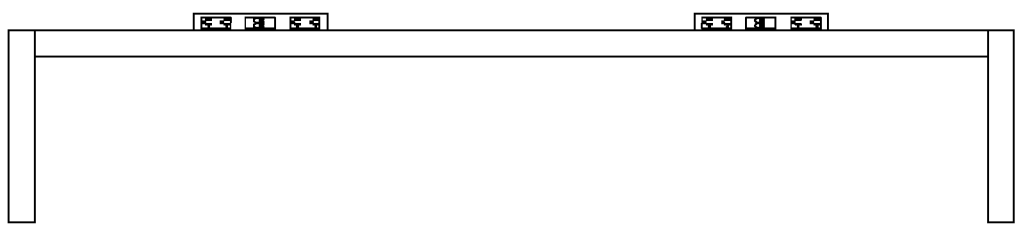
FIG. 26 shows a rear view thereof in the second state.
Figure 27:
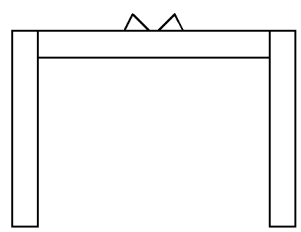
FIG. 27 shows a left side view thereof in the second state.
Figure 28:
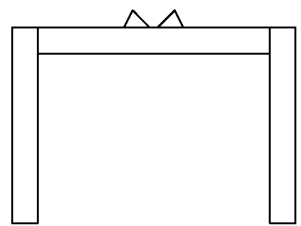
FIG. 28 shows a right side view thereof in the second state.
Figure 29:
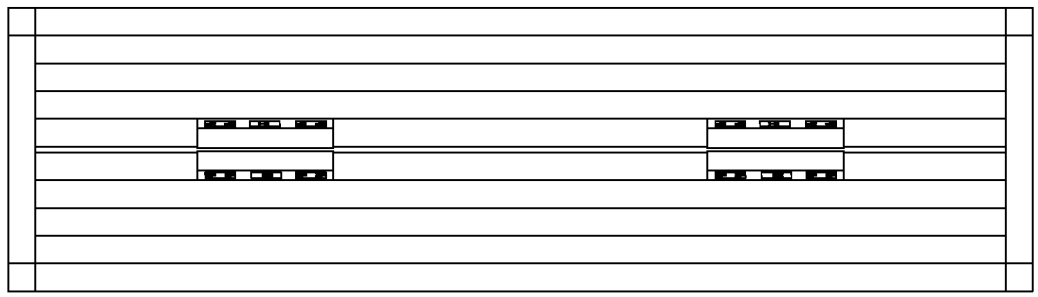
FIG. 29 shows a top view thereof in the second state.
Figure 30:
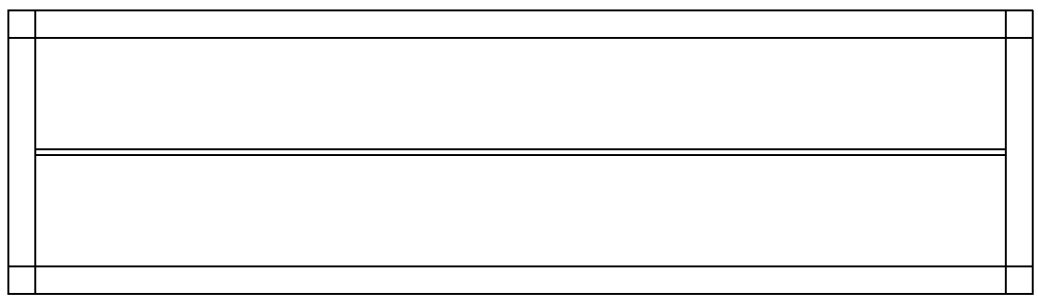
FIG. 30 shows a bottom view thereof in the second state.

FIG. 16 shows a table 100 according to an embodiment. FIG. 16 shows a pair of port housings 200 arranged in a back-to-back configuration. One of the port housings 200 is shown in the first position where top surface 202 is flush with table top surface 106. The other port housing 200 is oriented in the second position with functional surface 204 deployed above table top surface 106. As depicted in FIG. 16, individual port housings 200 can be rotated independent of each other. Additionally, FIG. 16 shows that port housings 200 can be arranged in a back-to-back configuration and can be rotated using an assembly 300 according to embodiments described herein without interfering with each other.

The foregoing description, for purposes of explanation, used specific nomenclature to provide a thorough understanding of the described embodiments. However, it will be apparent to one skilled in the art that many of the specific details are not required in order to practice the described embodiments. Thus, the foregoing descriptions of the specific embodiments described herein are presented for the purposes of illustration and description. They are not target to be exhaustive or to limit the embodiments to the precise forms disclosed. It will be apparent to one of ordinary skill in the art that many modifications and variations are possible in view of the above teachings.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A table comprising:
   a table top surface defining at least one aperture therethrough;
   a port housing disposed in the aperture and rotatable between a closed position and an open position, wherein the port housing comprises:
      a top surface; and
      a functional surface coupled to the top surface;
   at least one port coupled to the functional surface for supplying power or data;
   a support bar disposed below the table top surface and hidden from view from above the table top surface;
   wherein the port housing is rotatable about the support bar;
   wherein the port housing top surface is flush with the table top surface in the closed position;
   wherein the port housing top surface is immediately adjacent to the table top surface in the closed position; and
   wherein the port housing top surface and the functional surface are each orientated at a non-zero angle relative to the table top surface in the open position.

2. The table of claim 1, wherein the port housing defines a through hole and the support bar extends through the through hole.

3. The table of claim 1, further comprising at least one sensor and a controller; the controller configured to:
   receive a first signal and a second signal from the at least one sensor;

rotate the port housing from the closed position to the open position in response to the first signal; and
rotate the port housing from the open position to the closed position in response to detecting the second signal.

4. The table of claim 1, further comprising a plurality of port housings disposed in a plurality of apertures defined by the table top surface.

5. The table of claim 4, wherein the plurality of port housings include at least one pair of port housings;
wherein the port housings in the at least one pair are disposed in a back-to-back configuration.

6. The table of claim 3, further comprising:
a plurality of port housings disposed in a plurality of apertures defined by the table top surface; and
a plurality of sensors;
wherein each port housing is coupled to an individual sensor.

7. The table of claim 6, wherein the controller is configured to independently rotate each of the plurality of port housings between the closed position and the open position.

8. The table of claim 6, wherein the controller is configured to rotate each of the plurality of port housings between the closed position and the open position simultaneously in response to detecting the first signal and the second signal from the at least one sensor.

9. The table of claim 1, wherein a portion of the port housing top surface extends below the table top surface in the second predefined position.

10. A table comprising:
a table top surface;
a port housing rotatable between a first position and a second position, wherein the port housing comprises:
a top surface;
a functional surface coupled to the top surface; and
a cavity defined by a cavity wall;
at least one port coupled to the functional surface for supplying power or data;
a linkage coupled to the cavity wall;
a motor and a gear box coupled to the linkage via a drive shaft, the motor, gear box, drive shaft, and linkage configured to rotate the port housing between the first and second positions.

11. The table of claim 10, wherein the motor, the gear box, and the drive shaft are all located below the table top surface on the side of the port housing adjacent to the functional surface.

12. The table of claim 10, wherein the cavity wall includes a first surface and a second surface, the first surface oriented at an angle of less than 90° relative to the top surface and the second surface oriented at an angle of less than 90° relative to the functional surface.

13. The table of claim 12, wherein the linkage comprises a curved finger slidably attached to the second surface.

14. The table of claim 13, wherein a first end of the curved finger is attached to the drive shaft and a second end of the curved finger is attached to the second surface.

15. The table of claim 13, wherein the curved finger curves around at least a portion of the port housing when the port housing is in the first position.

16. The table of claim 13, wherein the curved finger extends from outside the cavity to inside the cavity.

17. The table of claim 10, wherein the port housing defines a through hole;
wherein the table further comprises a support bar extending through the through hole; and
wherein the port housing is rotatable about the support bar.

18. The table of claim 17, wherein the motor, the gear box, and the drive shaft are all located on the side of the port housing opposite the through hole.

19. A table comprising:
a table top surface;
a port housing configured to be rotated between a first position and a second position, wherein the port housing comprises:
a top surface; and
a functional surface coupled to the top surface;
at least one port coupled to the functional surface for supplying power or data;
a motor configured to rotate the port housing between the first position and the second position;
a sensor coupled to the table below the table top surface and in communication with a controller and configured to automatically sense an external condition, wherein the controller is configured to:
detect a first signal and a second signal from the sensor;
rotate the port housing from the first position to the second position in response to detecting the first signal; and
rotate the port housing from the second position to the first position in response to detecting the second signal.

20. The table of claim 19, wherein the external condition is movement, and wherein the sensor is a motion sensor that sends at least one of the first signal and the second signal in response to sensing motion.

21. The table of claim 19, wherein the external condition is capacitance, and wherein the sensor is a capacitive touch sensor that sends at least one of the first signal and the second signal in response to sensing touch.

22. The table of claim 19, wherein the external condition is a weight, and wherein the sensor is a weight sensor that sends at least one of the first signal and the second signal in response to sensing weight above or below a threshold weight.

23. The table of claim 19, wherein the external condition is a device state, and wherein the sensor is a device state sensor that sends at least one of the first signal and the second signal in response to sensing a device state above or below a threshold value.

24. The table of claim 23, wherein the device state is battery life.

25. The table of claim 23, wherein the device state is wireless signal strength.

26. The table of claim 19, wherein the external condition is an RFID signal, and wherein the sensor is an RFID scanner that sends at least one of the first signal and the second signal in response to sensing identification information on an RFID card.

27. The table of claim 19, wherein the external condition is a barcode pattern, and wherein the sensor is a barcode scanner that sends at least one of the first signal and the second signal in response to reading a barcode.

28. A method for deploying electrical ports on a table, the method comprising:
receiving a first signal from a sensor disposed below a top surface of a table;
rotating a port housing from a first position to a second position relative to the top surface of the table in response to receiving the first signal, wherein a top surface of the port housing is flush with the table top surface in the first position, and wherein the port housing top surface is oriented at an oblique angle to the table top surface and at least one electrical port of the port housing is deployed above the table top surface in the second position;

receiving a second signal from the sensor; and rotating the port housing from the second position to the first position in response to receiving the second signal.

29. The method of claim 28, wherein the sensor is a motion sensor that sends at least one of the first signal and the second signal in response to sensing motion.

30. The method of claim 28, wherein the sensor is a capacitive touch sensor that sends at least one of the first signal and the second signal in response to sensing touch.

31. The method of claim 28, wherein the sensor is a weight sensor that sends at least one of the first signal and the second signal in response to sensing weight above or below a threshold weight.

32. The method of claim 28, wherein the sensor is a device state sensor that sends at least one of the first signal and the second signal in response to sensing a device state above or below a threshold value.

33. The method of claim 32, wherein the device state is battery life.

34. The method of claim 32, wherein the device state is wireless signal strength.

35. The method of claim 28, wherein the sensor is an RFID scanner that sends at least one of the first signal and the second signal in response to sensing identification information on an RFID card.

36. The method of claim 28, wherein the sensor is a barcode scanner that sends at least one of the first signal and the second signal in response to reading a barcode.

\* \* \* \* \*